Sept. 23, 1952 W. JACOBSON 2,611,399
DRAG SAW HAVING ANGULARLY ADJUSTABLE BLADE
Filed Sept. 23, 1949 2 SHEETS—SHEET 1
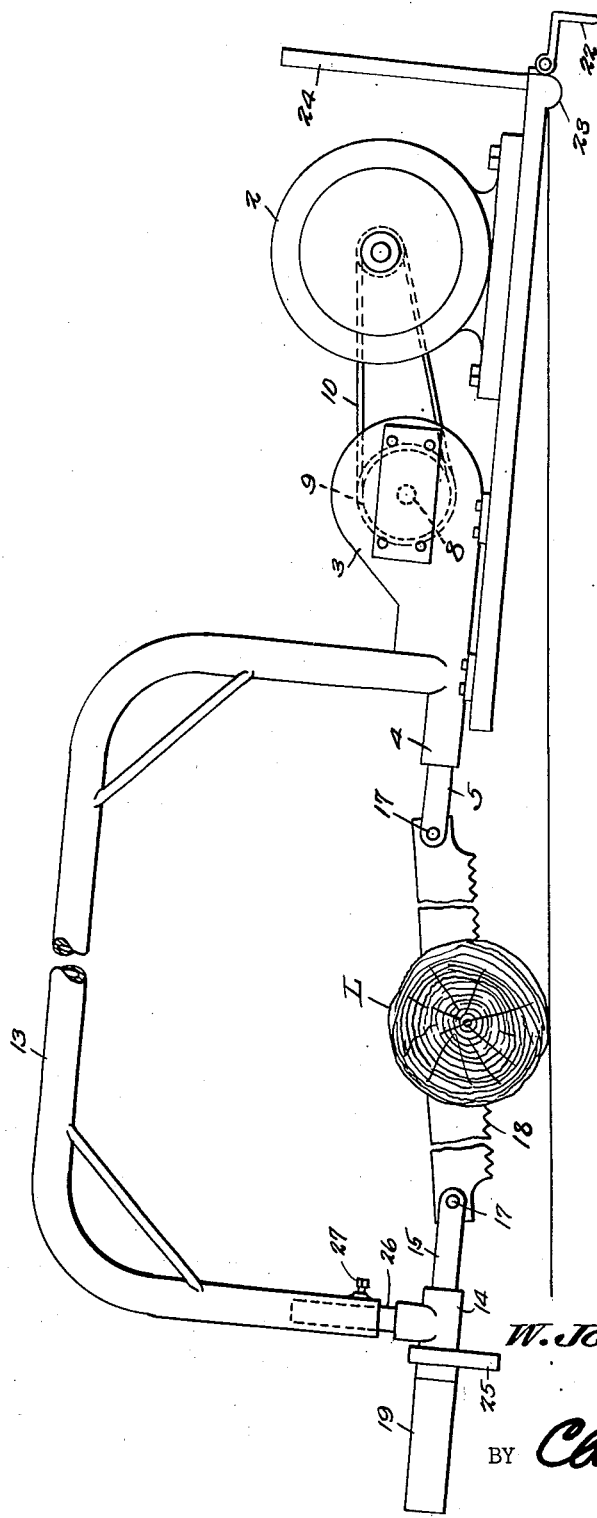
Fig. I.
W. Jacobson
INVENTOR
BY C. A. Snow & Co.
ATTORNEYS.

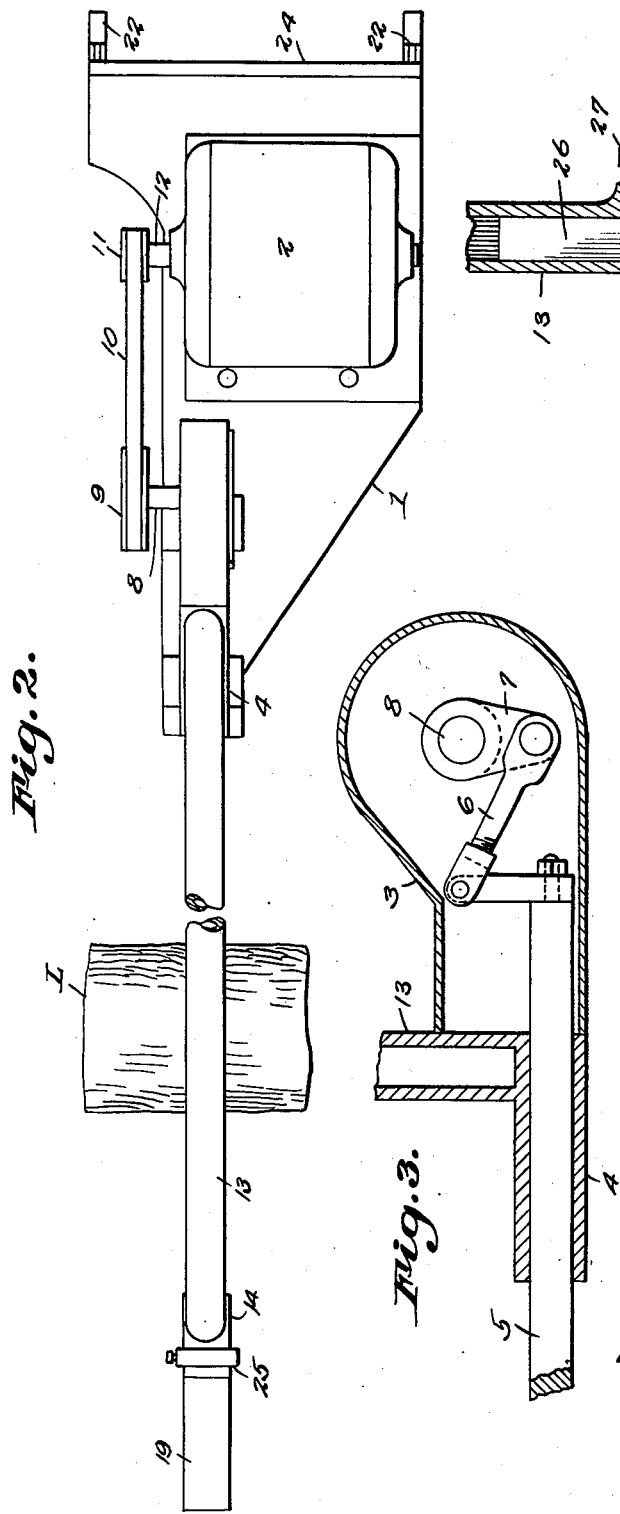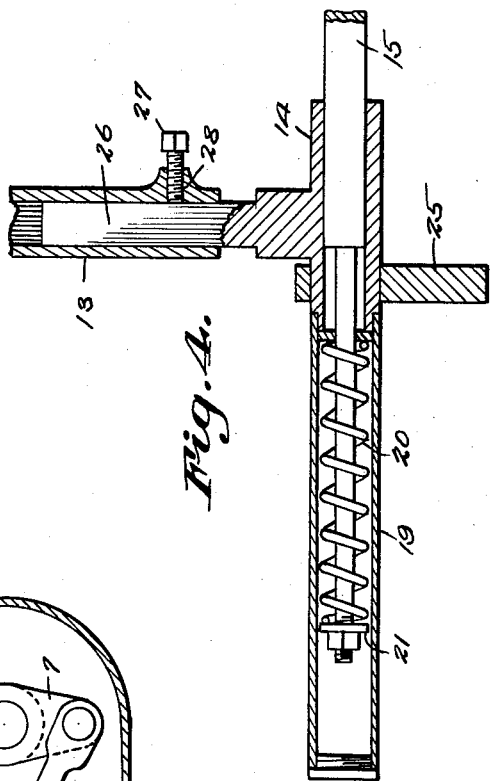

Patented Sept. 23, 1952

2,611,399

UNITED STATES PATENT OFFICE 2,611,399

DRAG SAW HAVING ANGULARLY ADJUSTABLE BLADE

William Jacobson, Ashford, Wash.

Application September 23, 1949, Serial No. 117,286

1 Claim. (Cl. 143—63)

This invention relates to saws designed primarily for cutting logs and other large timbers, one of the objects being to provide a motor driven saw in which the angular position of the saw blade may be adjusted relative to the axis of reciprocation of the saw driving element.

A further object is to provide a structure of this character which is simple and compact in construction and will not readily get out of order.

A further object is to provide a structure of this character which is so formed as to carry accumulated sawdust out of the cut, on each outward stroke of the saw blade.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings, the preferred form of the invention has been shown.

Referring to the drawings

Fig. 1 is a front elevation of the saw in use, portions being broken away, the angular disposition of the saw blade being somewhat exaggerated to show the operation more clearly.

Fig. 2 is a top plan view.

Fig. 3 is an enlarged section showing the shank at one end of the saw and the means for transmitting motion thereto from a driven shaft.

Fig. 4 is a section through the bearing of a shank at the other end of the saw showing the restraining spring used in connection therewith.

Fig. 5 is a detailed view of an adjustable stop used as a part of the device.

Referring to the drawings in detail, 1 designates a wide flat base which can be of any suitable material and is provided, between its ends, with a motor 2. This can be an electric motor or an internal combustion motor. A housing 3 is mounted on the base near one end and has a bearing 4 in which a shank 5 is mounted for reciprocation. This shank can be angular in cross section and has one end connected by a pitman 6 to a crank 7 which is carried by or formed with a transverse shaft 8 journaled in the housing. A pulley 9 is secured to the shaft 8 and is driven by belt 10 or the like from a pulley 11 on the shaft 12 of the motor 2.

A tubular yoke 13 is connected at one end to the bearing 4 while its other end receives a stud 26 rigid with a bearing 14 in which a shank 15 is mounted to reciprocate. The stud 26 is secured rigidly to the yoke in selected positions of telescoping adjustment, by means of a set screw 27 threaded in opening 28 of the yoke. The shank 15 can be rectangular in cross section and is slightly out of alignment relative to the shank 5. Both the shank 5 and the shank 15 are detachably secured by bolts 17 to the respective ends of a saw 18.

A housing 19 is extended from the bearing 14 and contains a coiled spring 20 which extends around a portion of the shank and exerts a constant thrust against a head 21 detachably and adjustably connected to one end of the shank 15.

The action of the spring serves to hold the saw taut and obviously when the motor is operated, the shaft 8 is driven thereby and the saw caused to reciprocate. Each time the saw is pulled toward the base 1, the spring is compressed and after the saw reaches the limit of movement toward the base, it will be pulled back to its other extreme position by the action of the spring and also by the thrust exerted thereagainst by the pitman 6 and the crank 7.

Anchoring devices, in the form of angular brackets 22 or the like, are joined to that end of the base 1 remote from the bearing 4 and adapted to be forced into the ground. Instead of providing these brackets, or in addition thereto, a bearing rib 23 can be formed along the bottom of the base 1 at said end. Furthermore, extended upwardly from said end of the base is a combined guard and stand 24 which can be integral with or attached to the base and forms a rigid structure on which the entire mechanism can rest when the saw and base are swung upwardly to substantially vertical positions. In other words, with the structure standing on this base or guard 24, the saw can be reciprocated substantially vertically or stored conveniently.

An important feature of the invention is the fact that when the saw is used for cutting downwardly through a log L or the like, the base 1 will be mounted solely on one end and the weight of the base and the parts carried thereby will be such as to force the saw to feed through the log while the saw is being reciprocated. This is by reason of the fact that the brackets 22 are pivots for the base as well as anchors. One bracket can be driven into the ground deeper than the other to compensate for an incline in the ground, thus permitting anchoring of the base in positions of transversely tilted adjustment. This also permits the making of inclined saw cuts. In the latter instance, it is to be noted that all the weight of the gravity fed parts is located between the pivots represented by the brackets, and the blade is disposed substantially centrally of the brackets. This prevents over-balancing of the transversely-tilted mechanism.

It is to be understood that any suitable means may be provided whereby proper lubrication of the working parts can be effected as necessary.

The adjustable stop 25 can be used to limit the downward swing of the saw. If not in use it can be held in an upwardly extended position.

In accordance with the invention, the shanks 5 and 15 reciprocate in an out-of-line arrangement, that is, it is intended that they be out of longitudinal alignment with each other, and that the outer shank 15 reciprocate in a somewhat lower path than that of the inner shank 5. This misalignment of the shanks is exaggerated in the drawings, but in actuality should be very slight, depending mainly upon the length of the stroke. It may be from approximately one-fourth to one-half inch.

As a result, the saw blade is disposed obliquely to the line of movement of the shanks, and this arrangement has the effect of causing the saw blade to rise from the cut during its outward stroke, and to drop down on its return or cutting stroke, thus carrying the accumulated sawdust out of the cut.

For the purpose of disposing the shanks 5 and 15 in a selected out-of-line relative arrangement, the stud 26 integral with the shank bearing 14 has been illustrated as telescopically received in the yoke 13, in which it will be rigidly secured in a selected position by means of the set screw 27. Of course, other means, within the scope of the claim, may be employed in providing a construction which will carry forth the idea of out-of-line mounting of the shanks for angular positioning of the saw blade 18, to give the saw blade a cleaning function on one stroke and a cutting function on the other stroke.

What is claimed is:

In a power driven saw of the type comprising a U-shaped yoke having elongated spaced parallel legs and a bight portion carried by and extending between the legs, a bearing carried by one of the legs remote from the bight portion, a shank mounted in the bearing for reciprocation in a rectilinear path which lies parallel with the bight portion, a prime mover mounted adjacent the yoke, means connected to the prime mover and to the shank for reciprocating the shank in the rectilinear path, a second bearing member, a shank mounted in the second bearing member for reciprocation in a rectilinear path which lies in spaced parallel relation to the bight portion, and a saw blade connected to the shanks and extending between the legs remote from the bight portion, the other of said legs being provided with a socket which opens through the end thereof, a stud carried by the second mentioned bearing member and telescopically entering the socket, and means carried by said other leg and releasably engaging the stud for holding the second mentioned bearing member in a selected position relative to said leg, whereby the angular position of the saw blade relative to the axis of reciprocation may be adjusted.

WILLIAM JACOBSON.

REFERENCES CITED

The following references are of record in the file of this patent:

UNITED STATES PATENTS

| Number | Name | Date |
| --- | --- | --- |
| 16,421 | Winter | Jan. 13, 1857 |
| 229,908 | Nunan | July 13, 1880 |
| 1,119,524 | Morris et al. | Dec. 1, 1914 |
| 1,289,604 | Baker | Dec. 13, 1918 |
| 1,450,540 | Boner | Apr. 3, 1923 |
| 2,206,614 | O'Hern | July 2, 1940 |